United States Patent [19]
Yamamoto et al.

[11] Patent Number: 5,970,445
[45] Date of Patent: Oct. 19, 1999

[54] SPEECH RECOGNITION USING EQUAL DIVISION QUANTIZATION

[75] Inventors: Hiroki Yamamoto, Yokohama; Yasuhiro Komori, Kawasaki, both of Japan

[73] Assignee: Canon Kabushiki Kaisha, Tokyo, Japan

[21] Appl. No.: 08/820,255

[22] Filed: Mar. 18, 1997

[30] Foreign Application Priority Data

Mar. 25, 1996 [JP] Japan .................................. 8-068040

[51] Int. Cl.$^6$ ....................................................... G10L 7/02
[52] U.S. Cl. ............................................................. 704/230
[58] Field of Search .................................. 704/230, 256, 704/250, 222

[56] References Cited

U.S. PATENT DOCUMENTS

| | | |
|---|---|---|
| 5,124,701 | 6/1992 | Charbonnier et al. . |
| 5,706,391 | 1/1998 | Yamada et al. ...................... 704/231 |

OTHER PUBLICATIONS

Wu, Y, et al., A Supervised Learniong Neural Network Coprocessor for Soft–Decision Maximum–Likelihood Decoding, IEEE Transactions on Neural Networks, vol. 6, No. 4, Jul. 1995, pp. 986–992.

Yamaguchi, H., "Optimum Quantization of Laplace Density Signal and Its Characteristics", Electronics and Communications in Japan, May 1984, vol. 67, No. 5, pp. 67–73.

*Primary Examiner*—David R. Hudspeth
*Assistant Examiner*—M. David Sofocleous
*Attorney, Agent, or Firm*—Fitzpatrick, Cella, Harper & Scinto

[57] ABSTRACT

Hitherto, when speech data is quantized, since a quantum is determined irrespective of a deviation of a distribution of the speech data, an error of an output probability calculation by quantization is large and a recognition rate deteriorates. According to the invention, to solve the subject of the prior art, a quantization range of speech data is obtained, an integral value of an output probability of the quantization range is obtained by using an output probability distribution of statistic models of speech data which has previously been obtained, a quantum is determined so as to equally divide the integral value, and a quantization code book is formed, thereby reducing an error of an output probability due to the quantization and enabling a recognition rate to be improved.

24 Claims, 10 Drawing Sheets

SPEECH RECOGNITION USING EQUAL DIVISION QUANTIZATION

BACKGROUND OF THE INVENTION

1. Field of the Invention

The invention relates to speech processing method and apparatus which can be used for recognition of input speech.

2. Related Background Art

Hitherto, as shown in FIG. 3, in a code book, a quantization range is determined by step S31 for determining a min-max quantization range and a quantum is determined in the quantization range in step S32 for determining a quantum by equally dividing the quantization range. Each of the above steps is processed as follows.

<Step S31 of determining min-max quantization range>

With respect to all of the distributions of the dimension of HMM as a statistic model of speech data that is used for speech recognition, a value obtained by adding or subtracting a value which is a predetermined number of times as large as a standard deviation to/from an average of the distributions is derived for every dimension and the maximum value and the minimum value of the resultant value obtained are set to a quantization range of the relevant dimension.

Specifically speaking, the i-dimensional quantization range $[R_{min,i}, R_{max,i}]$ is obtained as follows.

$$R_{min,i} = \min_{m=1}^{Mi}(\mu_{m,i} - \alpha \cdot \sigma_{m,i}) \qquad (1)$$

$$R_{max,i} = \max_{m=1}^{Mi}(\mu_{m,i} + \alpha \cdot \sigma_{m,i}) \qquad (2)$$

where, m: distribution number (m=1, 2, . . . , $M_i$)

$M_i$: the total number of i-dimensional distributions $\mu_{m,i}$: average of the i-dimensional m-th distribution $\sigma_{m,i}$: standard deviation calculated from the divergence of the i-dimensional m-th distribution α: coefficient to determine the quantization range FIG. 4 shows an image diagram of the min-max quantization range determining step.

<Step S32 of determining quantum by equally dividing quantization range>

A quantum is determined for every dimension so as to equally divide the quantization range.

When the i-dimensional quantization range is set to $[R_{min,i}, R_{max,i}]$ and the number of quantization steps is equal to N, a j-th ($1 \leq j \leq N$) quantum $C_{i,j}$ is determined by the following equation (3) in step S3 of determining the quantum by equally dividing the quantization range.

$$C_{i,j} = R_{min,i} + \frac{(R_{max,i} - R_{min,i}) \cdot (j - 1)}{N - 1} \qquad (3)$$

FIG. 5 shows an image diagram of the step of determining the quantum by equally dividing the quantization range.

SUMMARY OF THE INVENTION

In the above conventional technique, when the quantization range is determined by the min-max quantization range determining step, if a distribution that is largely deviated from the other deviations exists in the distribution, the quantization range is widened by information from the deviated distribution irrespective of the significance of the distribution. Such a state is shown in FIG. 4. When the quantum is decided in accordance with step S32 of determining the quantum by equally dividing the quantization range, the quantums are equally set in the quantization range. Therefore, the quantum is set into a range of a small distribution, namely, a range which is not so frequently used. On the other hand, the number of quantums to be set in a range of a large distribution which will be frequently used is reduced (refer to FIG. 5). There is, consequently, a problem such that when the number of quantization steps is small, an approximation of an input vector by a scalar quantization becomes coarse, the error of an output probability calculation by the quantization increases, and the recognition rate deteriorates.

To solve the above problem, it is an object of the invention to provide a speech processing method and apparatus in which a quantization range of speech data is obtained, an integral value of an output probability of a distribution in a derived quantization range is obtained by using an output probability distribution of statistical models of speech data which have previously been obtained, and a quantum is determined so as to equally divide the integral value, thereby forming a quantization code book. Thus, even when the number of quantization steps is small, an efficient scalar quantization is realized and the speech recognition rate can be improved.

DETAILED DESCRIPTION OF THE PREFERRED EMBODIMENT

Figure 1:
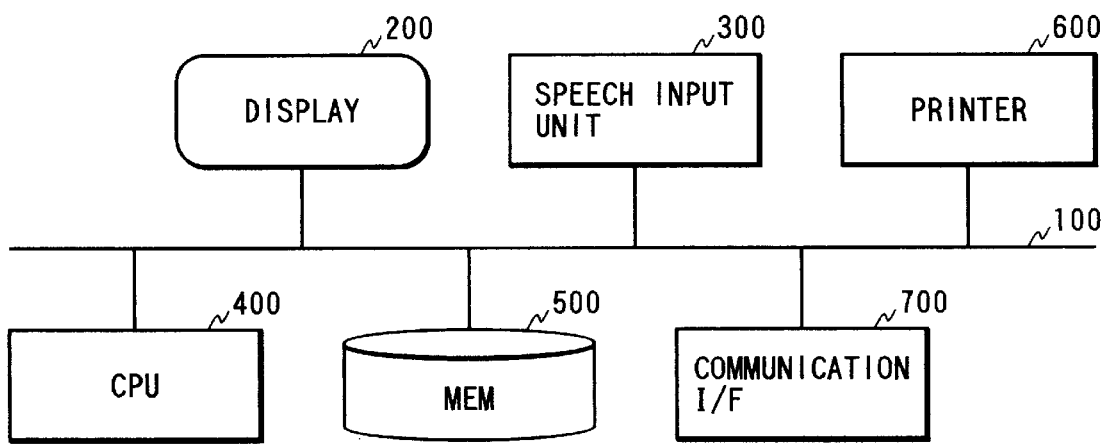
FIG. 1 is a block diagram of a speech recognition system.
Figure 2:
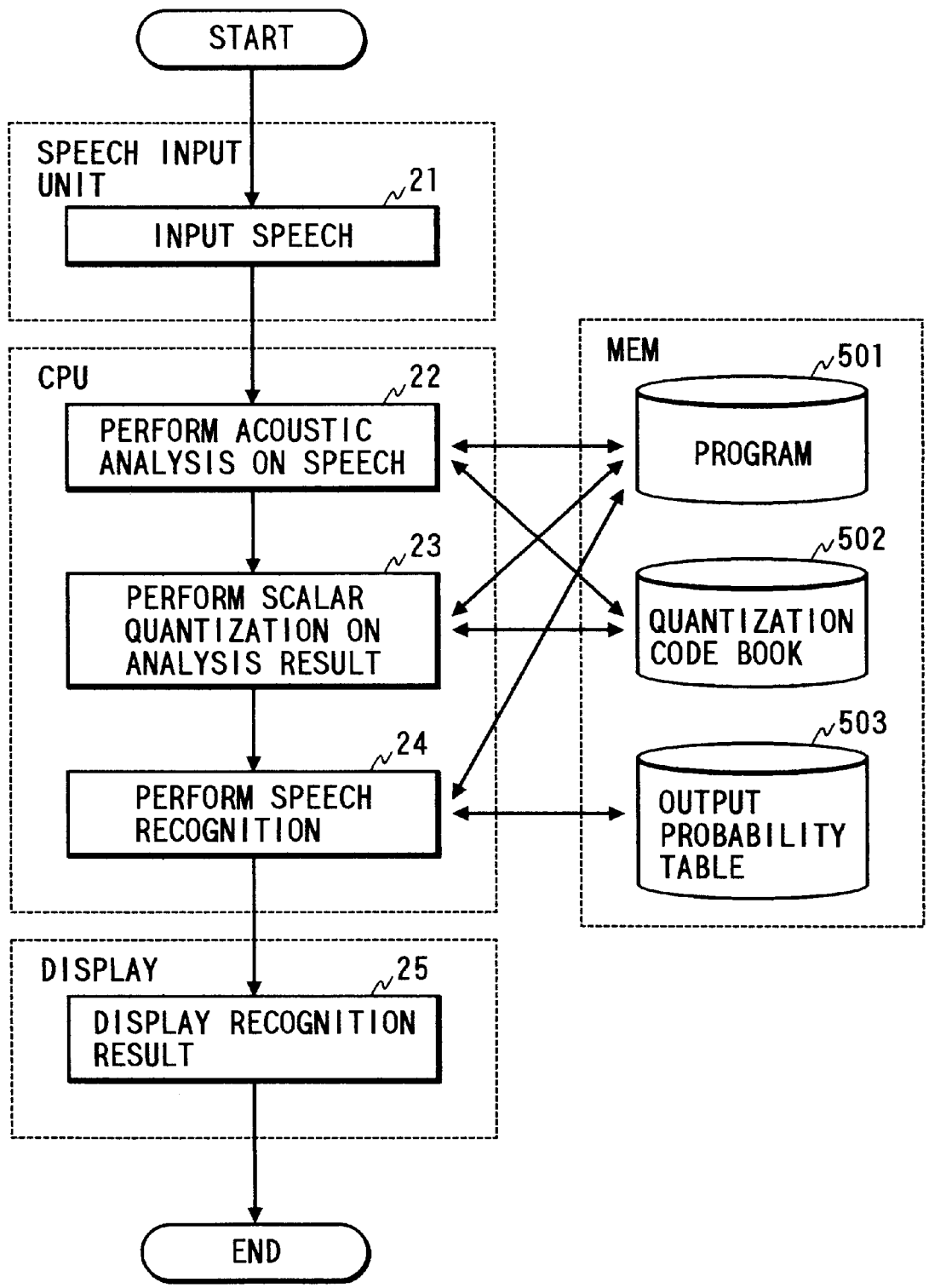
FIG. 2 is a flowchart for a speech recognizing method.
Figure 3:
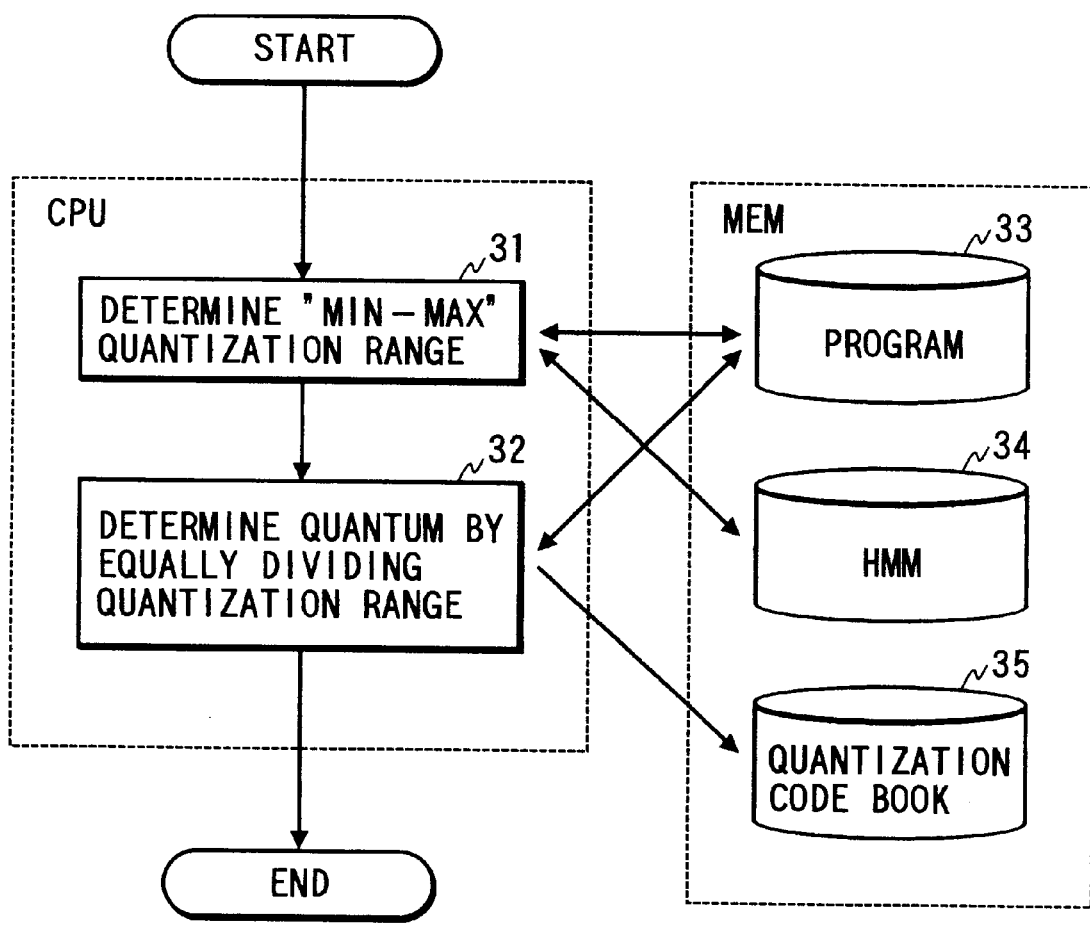
FIG. 3 is a flowchart for a conventional code book forming method.

An embodiment of the invention will now be described hereinbelow with reference to the drawings. FIG. 1 is a block diagram showing an example of a schematic construction of a computer as a speech recognizing apparatus according to the invention. FIG. 2 is a flowchart for a speech recognizing method according to the invention. Speech obtained by a speech input unit (300) in FIG. 1 in speech input step S21 is subjected to an acoustic analyzing process by a CPU (400) in acoustic analyzing step S22 in an accordance with a program 5002 stored in a memory (500). In accordance with a program 5003 stored in the memory 500, the analysis result is scalar quantized in scalar quantization step S23 on the basis of a quantization code book 502 stored in the memory (500) every dimension. In speech recognition step S24, an output probability is obtained and speech is recognized with reference to an output probability table 503 of each distribution of each HMM for the quantums stored in the memory (500). In recognition result display step S24, the recognition result is outputted to a display (200).

Figure 12:
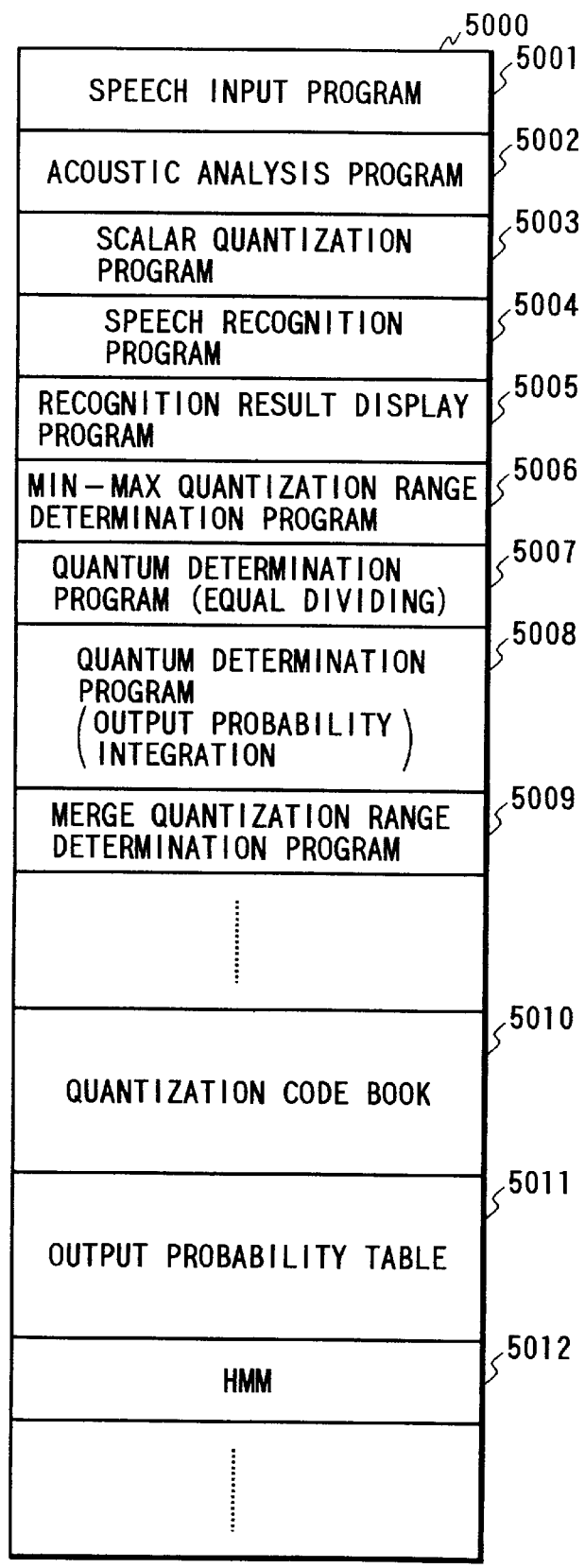
FIG. 12 is a diagram showing an example of a memory map of a memory.

The display 200 is a CRT or a liquid crystal display or a display control unit to allow a character train of the recognition result to be displayed on those displays. In place of the display 200, it is also possible to provide a printer 600 such as LBP, ink jet printer, or the like to print the recognition result. The speech input unit inputs speech through a microphone, a public line, or the like. In accordance with a control program stored in the memory 500, the CPU 400 executes each process according to the invention, which will be explained in detail hereinbelow. The memory 500 is an ROM or RAM built in the apparatus main body or a CD-ROM or FD which is detachable for the apparatus main body. The memory 500 stores speech data inputted from the speech input unit 300, control program (501), quantization code books (502, 505, 507), output probability table (503), and parameters such as information (504) of HMM and the like. Further, a working area is also provided for the memory 500. The control program and parameters stored in the memory 500 can be also previously stored in the memory 500 or can be also read out from another apparatus through a communication I/F 700 and supplied to the apparatus prior to processing. FIG. 12 shows a memory map example of the data stored in the memory 500.

Figure 6:
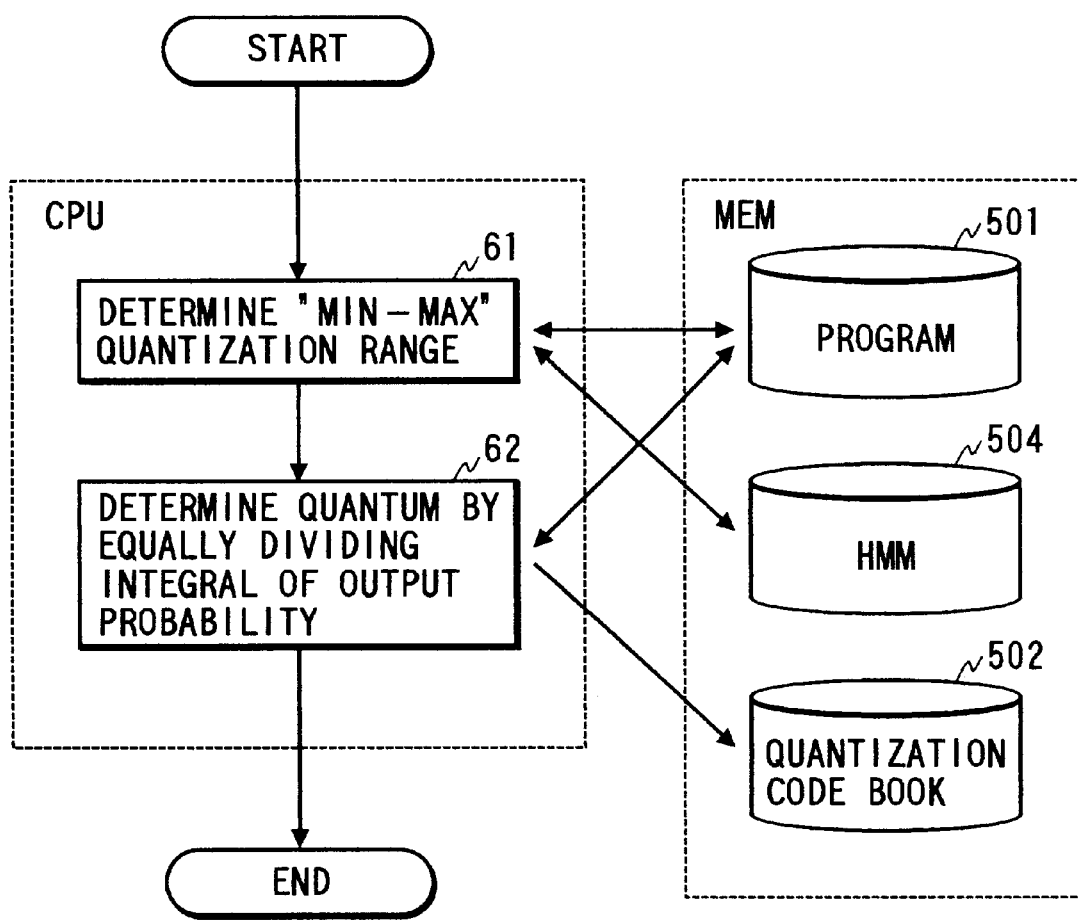
FIG. 6 is a flowchart for a first code book forming method.

A method of forming the quantization code book 502 that is used when performing the characteristic scalar quantization of the invention will now be described with reference to FIG. 6.

In accordance with a program 5006 stored in the memory (500) and on the basis of the information of the HMM stored in the memory (500), the quantization range is determined (S61) by the CPU (400) in a min-max quantization range determining step described already as a prior art. On the basis of the determined quantization range and in accordance with a program 5008 stored in the memory (500), the quantum is determined by the CPU (400) in an output probability integral value equal division quantum determining step (S62). The decided quantum is stored as a quantization code book 502 into the memory (500). More detailed processes which are executed in an output-probability integral value equal division quantum determining step (S62) will now be described hereinbelow.

<Step of determining output probability integral value equal division quantum (S62)>

Figure 7:
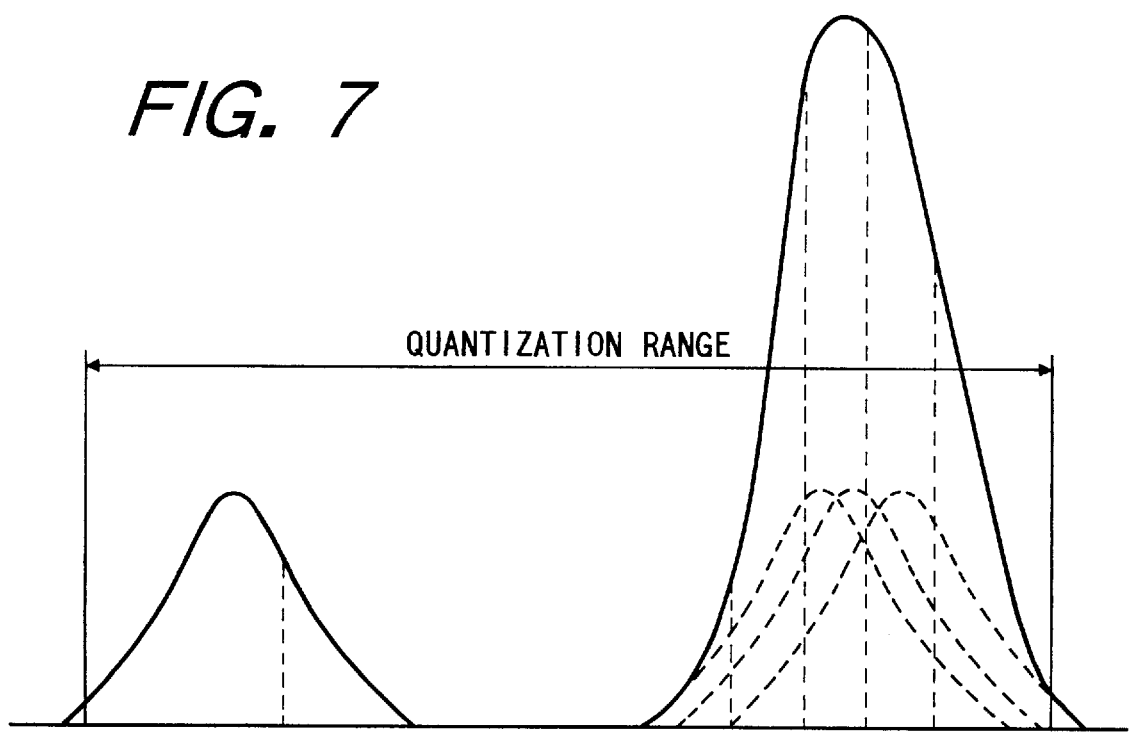
FIG. 7 is an image diagram of an output probability integral value equal division quantization.

Integral values of output probabilities in the quantization range of all of the distributions are obtained with respect to each dimension and the quantum is determined so as to equally divide the integral values. Such an image diagram is shown in FIG. 7. FIG. 7 shows an i-dimensional quantum distribution.

Figure 8:
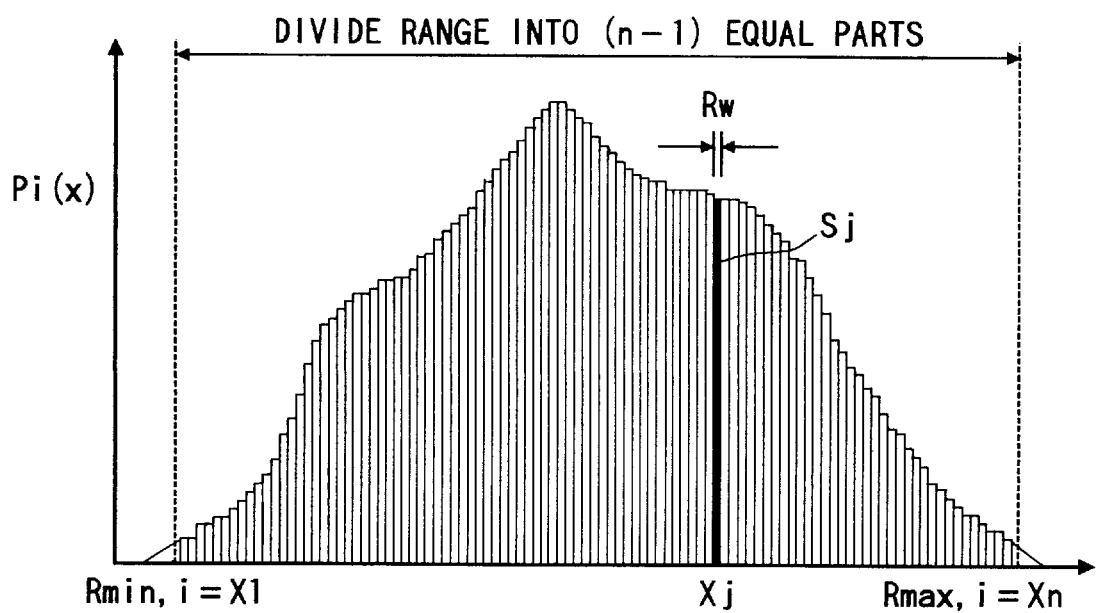
FIG. 8 is an image diagram of a method of obtaining an area of a certain range of an output probability of a mixed distribution.

It is assumed that the i-dimensional quantization range is set to $[R_{min.i}, R_{max.i}]$, the number of quantization steps is set to N, the total number of distributions of the i-dimensional HMM is set to $M_i$, and an output probability by the i-dimensional m-th ($1 \leq m \leq M_i$) distribution when the input is x is set to $P_{m,i}(x)$. In this instance, integral value S within the quantization range is approximately obtained as a sum of areas of elongated rectangles as shown in FIG. 8.

$$P_i(x_j) = \sum_{m=1}^{Mi} P_{m,i}(x_j) \tag{4}$$

$$S_j = P_i(x_j) \cdot R_w \tag{5}$$

$$S = \sum_{j=1}^{n-1} S_j \tag{6}$$

where, $$R_w = \frac{R_{max.i} - R_{min.i}}{n-1} \tag{7}$$

$$x_j = R_{min.i} + R_w \cdot (j-1) (1 \leq j \leq n) \tag{8}$$

where, n is set to a value which is sufficiently larger than the number N of quantization steps. After the value S was approximately obtained as mentioned above, an i-dimensional k-th ($1 \leq k \leq N$) quantum $C_{i,k}$ is as shown in the following equation (9).

$$C_{i,k} = x_k \tag{9}$$

$$k = \underset{k}{\operatorname{argmin}} \left[ \left| \frac{S \cdot (k-1)}{N-1} - \sum_{j=1}^{k} S_i \right| \right] \tag{10}$$

The speech recognition operation is performed in accordance with the flowchart shown in FIG. 2 by using the quantization code book 502 formed in min-max quantization range determining step and the output probability integral value equal division quantum determining step described above.

Figure 9:
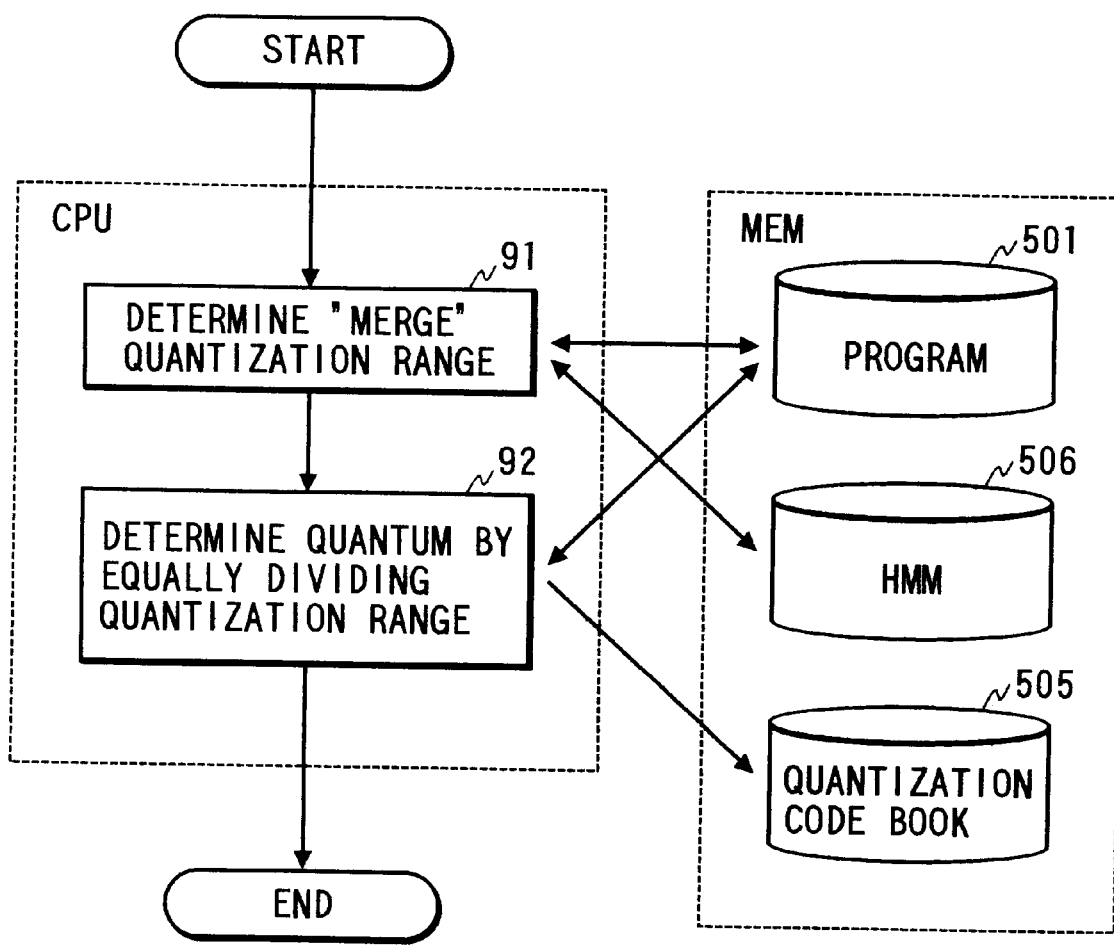
FIG. 9 is a flowchart for a second code book forming method.

FIG. 9 shows a flowchart in the embodiment when a second quantization code book is formed. In accordance with a program 5009 stored in the memory (500) and on the basis of information 506 of the HMM stored in the memory (500), a quantization range is determined by the CPU (400) in a merge quantization range determining step S91. On the basis of the decided quantization range and in accordance with a program 5007 stored in the memory (500), a quantum is determined by the CPU (400) in an equal division quantum determining step S92. The decided quantum is stored as a quantization code book 505 into the memory (500). A process that is executed in a merge quantization range determining step S91 will now be described hereinbelow.

<Merge quantization range determining step S91>

Figure 10:
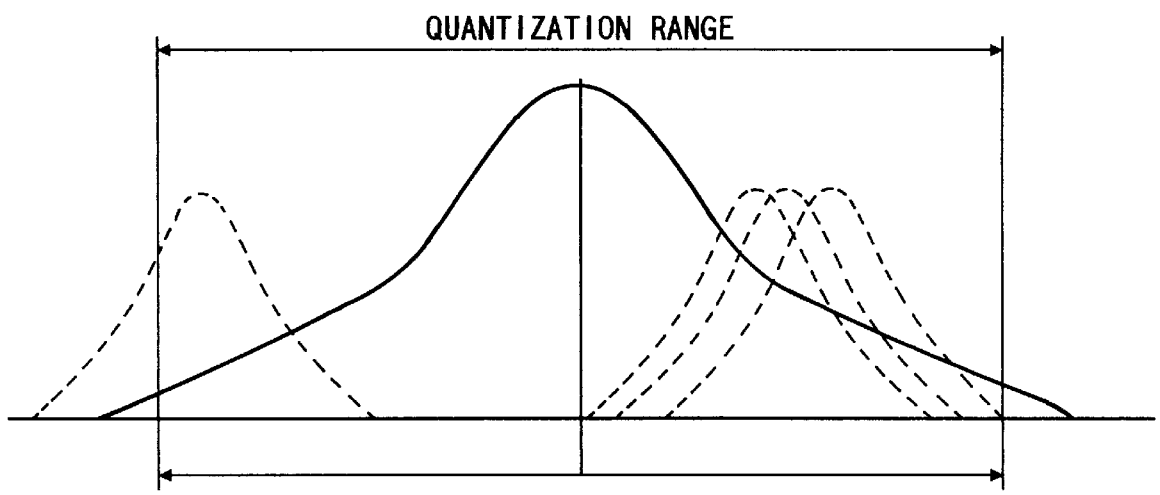
FIG. 10 is an image diagram of a merge quantization range.

All of the distributions of the relevant dimension of all of the HMMs which are used for speech recognition are synthesized to one distribution for every dimension. A value obtained by adding or subtracting a value that is a predetermined number of times as large as the standard deviation to/from the average of the distributions is set to the quantization range. An image diagram in such a case is shown in FIG. 10.

An i-dimensional quantization range $[R_{min.i}, R_{max.i}]$ is determined as follows by using a standard deviation $\sigma'_i$ and an average $\mu'_i$ of the distributions obtained by synthesizing the distributions of all of the HMMs which are used for i-dimensional recognition.

$$R_{min.i} = \mu'_i - \alpha \cdot \sigma'_i \tag{11}$$

$$R_{max.i} = \mu'_i + \alpha \cdot \sigma'_i \tag{12}$$

The synthesized M distributions are obtained by the following equations (13). It is assumed that an average of the synthesized distributions is set to $\mu'$ and a divergence is set to $\sigma'^2$.

$$\mu' = \sum_{m=1}^{M} \mu_m / M \qquad (13)$$

$$\sigma'^2 = \left( \sum_{m=1}^{M} \sigma_m^2 + \sum_{m=1}^{M} (\mu_m - \mu')^2 \right) / M$$

where, m: distribution number (m=1, 2, . . . , M)

$\mu_m$: average of the m-th distribution $\sigma_m$: standard deviation calculated from the divergence of the m-th distribution The speech recognition is executed in accordance with the flowchart shown in FIG. 2 by using the quantization code books formed in a merge quantization range determining step S91 and an equal division quantum determining step S92 described above.

Figure 11:
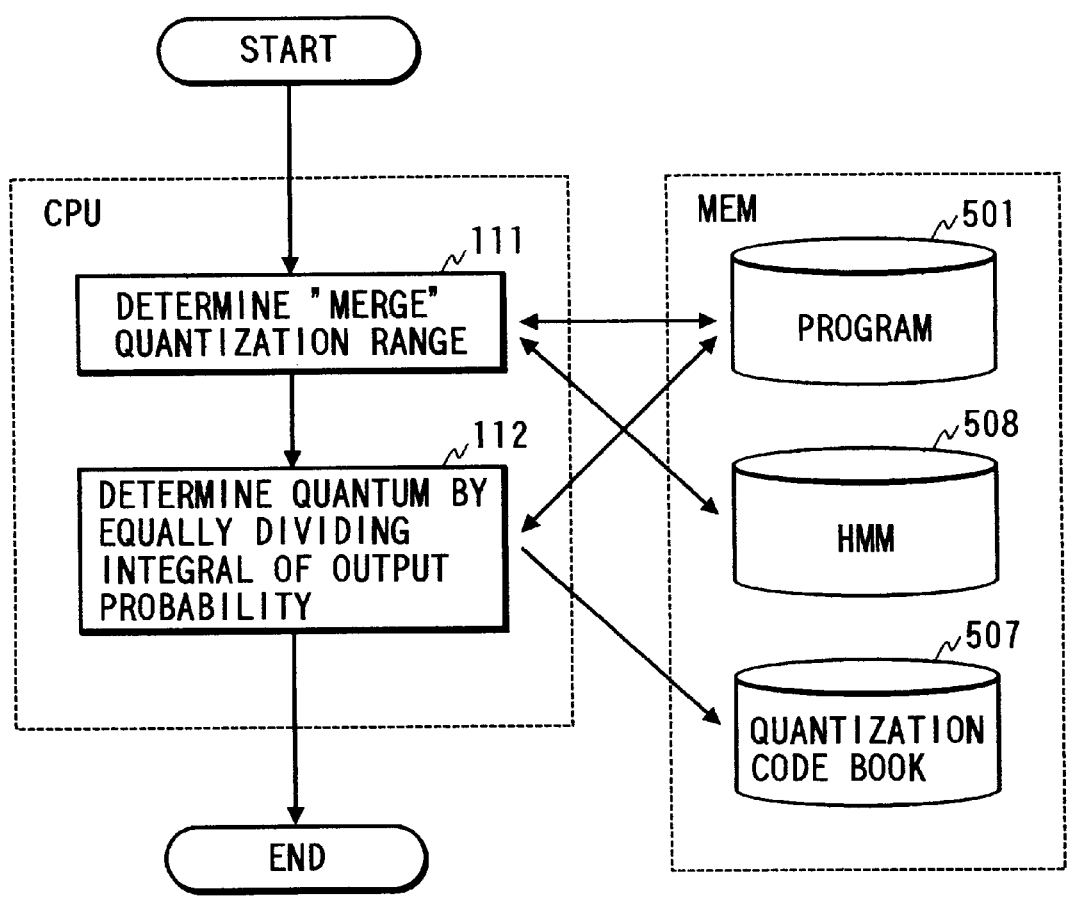
FIG. 11 is a flowchart for a third code book forming method.

A flowchart in the embodiment when a third quantization code book is formed is shown in FIG. 11. In accordance with the program 5009 stored in the memory (500) and on the basis of information 508 of the HMM stored in the memory (500), a quantization range is determined by the CPU (400) in a merge quantization range determining step S111. On the basis of the decided quantization range and in accordance with the program 5008 stored in the memory (500), a quantum is determined by the CPU (400) in an output probability integral value equal division quantum determining step S112. The decided quantum is stored as a quantization code book 507 into the memory (500).

A speech recognition operation is performed in accordance with the flowchart shown in FIG. 2 by using the quantization code books formed in a merge quantization range determining step S111 and an output probability integral value equal division quantum determining step S112.

What is claimed is:

1. A speech processing method comprising the steps of:

inputting speech data:

obtaining a quantization range of the input speech data;
    obtaining an integral value of an output probability of the obtained quantization range by using an output probability distribution of statistical models of speech data which has previously been obtained; and determining a quantum so as to equally divide the integral value, thereby forming a quantization code book.

2. A method according to claim 1, wherein when the quantization range of the speech data is obtained, a value is obtained which is an average of an output probability distribution of the statistical models plus or minus a mult probability distribution, and a maximum value and a minimum value of the obtained value are set to the quantization range.

3. A method according to claim 1, wherein output probability distributions of the statistical models are synthesized into one distribution, a value is obtained which is an average of the synthesized distribution plus or minus a multiple of a standard deviation calculated from the divergence of the distribution, and a maximum value and a minimum value of the obtained value are set to the quantization range.

4. A method according to claim 1, wherein when the speech data is expressed by a vector, the operation to obtain the quantization range of the speech data and the determination of the quantum of the speech data are executed for every dimension.

5. A method according to claim 3, wherein when the speech data is expressed by a vector, the synthesis of the distributions is executed for every dimension.

6. A method according to claim 1, wherein the statistical model of the speech data is a Hidden Markov Model.

7. A method according to claim 1, wherein the input speech is quantized by using the formed quantization code book and the quantized speech information is recognized.

8. A method according to claim 1, further comprising the step of recognizing the speech data using the formed quantization code book, wherein the result of the recognition is displayed on display means.

9. A method according to claim 1, further comprising the step of recognizing the speech data using the formed quantization code book, wherein the result of the recognition is printed by printing means.

10. A method according to claim 7, further comprising the step of inputting the speech data in said inputting step with a microphone.

11. A speech processing apparatus comprising:

input means for inputting speech data;

quantization range obtaining means for obtaining a quantization range of the input speech data;

integral value obtaining means for obtaining an integral value of an output probability of the obtained quantization range by using an output probability distribution of statistical models of speech data which has previously been obtained; and quantization code book forming means for determining a quantum so as to equally divide the integral value, thereby forming a quantization code book.

12. An apparatus according to claim 11, wherein the quantization range obtaining means obtains a value which is an average of an output probability distribution of the statistical models plus or minus a multiple of a standard deviation calculated from the divergence of the distribution and sets a maximum value and a minimum value of the obtained value of the quantization range.

13. An apparatus according to claim 11, wherein the quantization range obtaining means synthesizes output probability distributions of a plurality of statistical models into one distribution, obtains a value which is an average of the synthesized distribution plus or minus a mult deviation calculated from the divergence of the distribution, and sets a maximum value and a minimum value of the obtained value to the quantization range.

14. An apparatus according to claim 11, wherein when the speech data is expressed by a vector, the quantization range obtaining means obtains the quantization range of the speech data for every dimension, and said quantization code book forming means determines the quantum of the speech data for every dimension.

15. An apparatus according to claim 13, wherein when the speech data is expressed by a vector, said quantization range obtaining means synthesizes the distributions for every dimension.

16. An apparatus according to claim 11, wherein the statistical model of the speech data is a Hidden Markov Model.

17. An apparatus according to claim 11, further comprising:

quantizing means for quantizing the input speech by using the formed quantization code book; and recognizing means for recognizing the quantized speech information.

18. An apparatus according to claim 11, further comprising:

recognizing means for recognizing the input speech data using the formed quantization code book; and display control means for displaying a result of the recognition by said recognizing means by display means.

19. An apparatus according to claim 11, further comprising:

recognizing means for recognizing the input speech data using the formed quantization code book; and display means for displaying a result of the recognition by said recognizing means.

20. An apparatus according to claim 11, further comprising:

recognizing means for recognizing the input speech data using the formed quantization code book; and print control means for printing a result the recognition by said recognition means to printing means.

21. An apparatus according to claim 11, further comprising:

recognizing means for recognizing the input speech data using the formed quantization code book; and printing means for printing a result of the recognition by said recognizing means.

22. An apparatus according to claim 17, wherein said input means comprises a microphone for inputting the speech data.

23. A storage medium which can be read out by a computer, for storing the programs instructing the computer to perform the steps of:

inputting speech data;

obtaining a quantization range of the input speech data;

obtaining an integral value of an output probability of the obtained quantization range by using an output probability distribution of statistical models of speech data which has previously been obtained; and determining a quantum so as to equally divide the integral value and forming a quantization code book.

24. A program which is read out and is executed by a computer, which instructs the computer to perform the steps:

inputting speech data;

obtaining a quantization range of the input speech data; obtaining an integral value of an output probability of the obtained quantization range by using an output probability distribution of statistical models of speech data which has previously been obtained; and determining a quantum so as to equally divide the integral value and forming a quantization code book.

* * * * *

UNITED STATES PATENT AND TRADEMARK OFFICE
CERTIFICATE OF CORRECTION

PATENT NO.  : 5,970,445

DATED       : October 19, 1999

INVENTOR(S) : Hiroki YAMAMOTO et al.                              Page 1 of 3

It is certified that error appears in the above-identified patent and that said Letters Patent is hereby corrected as shown below:

ON THE COVER PAGE:

AT [56], References Cited, OTHER PUBLICATIONS:

After "Wu. Y. et al., A Supervised", "Learniong" should read --Learning--.

Figure 4:
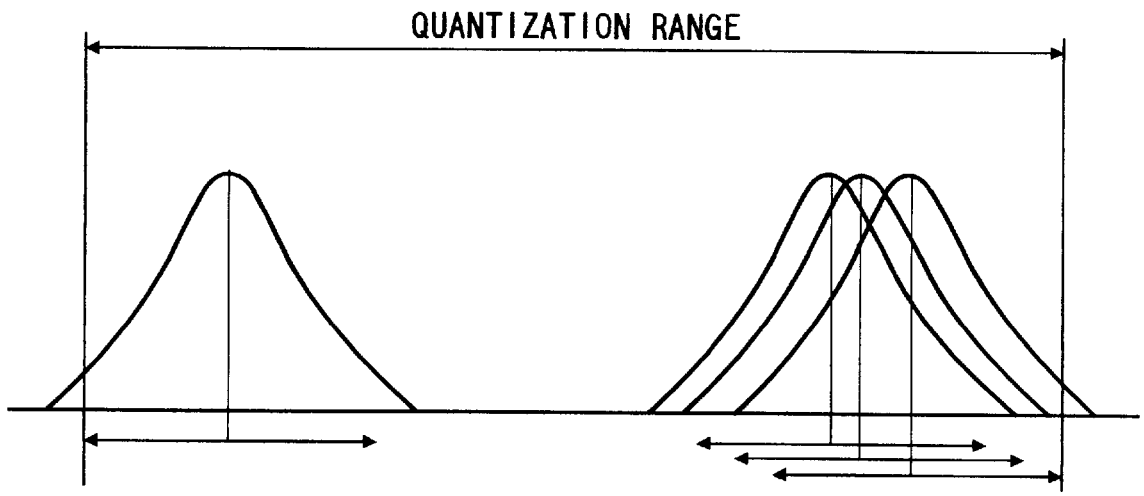
FIG. 4 is an image diagram of a conventional min-max quantization range.
Figure 5:
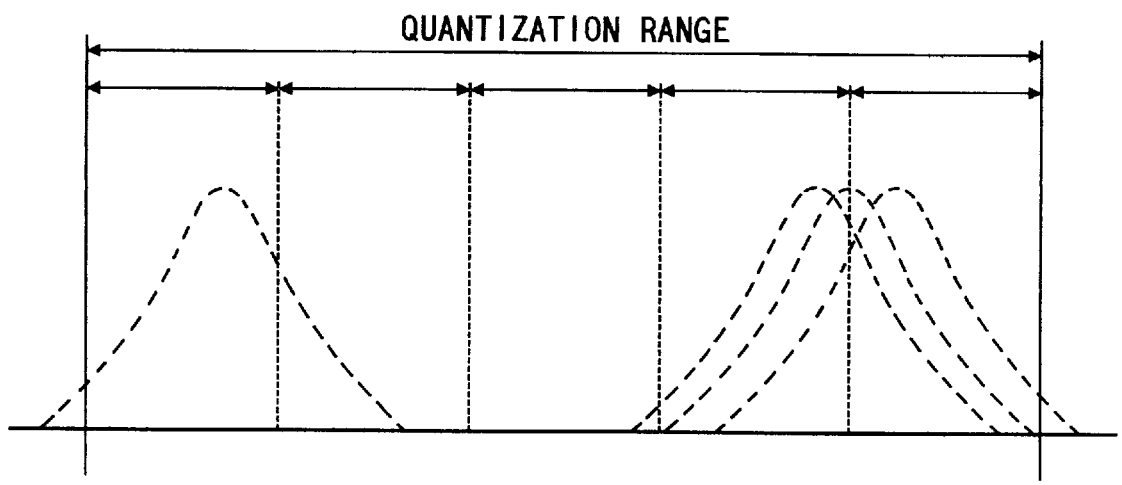
FIG. 5 is an image diagram of conventional quantums which were equally divided.

COLUMN 2:

Line 33, "method; FIG. 4" should read --method; ¶FIG. 4--.
Line 34, "range; FIG. 5" should read --range; ¶FIG. 5--.
Line 63, "an" should be deleted.

UNITED STATES PATENT AND TRADEMARK OFFICE
CERTIFICATE OF CORRECTION

PATENT NO. : 5,970,445

DATED : October 19, 1999

INVENTOR(S) : Hiroki YAMAMOTO et al.

It is certified that error appears in the above-identified patent and that said Letters Patent is hereby corrected as shown below:

COLUMN 4:

Line 58, "$_{Rmax,i}$]" should read --$R_{max,i}$]--.

COLUMN 5:

Line 52, "mult" should read --multiple of a standard deviation calculated from the divergence of the output--.

COLUMN 6:

Line 43, "mult" should read --multiple of a standard--.

COLUMN 7:

Line 16 "result the" should read --result of the--.

UNITED STATES PATENT AND TRADEMARK OFFICE
CERTIFICATE OF CORRECTION

PATENT NO. : 5,970,445

DATED : October 19, 1999

INVENTOR(S) : Hiroki YAMAMOTO et al.

It is certified that error appears in the above-identified patent and that said Letters Patent is hereby corrected as shown below:

COLUMN 8:

Line 13, "steps:" should read --steps of:--.
Line 16, "obtaining" should read --¶obtaining--.

Signed and Sealed this

Thirty-first Day of October, 2000

Q. TODD DICKINSON

*Attest:*

*Attesting Officer*          *Director of Patents and Trademarks*